US012755355B2

(12) United States Patent

Ahmed et al.

(10) Patent No.: US 12,755,355 B2
(45) Date of Patent: Oct. 6, 2026

(54) SYSTEM AND METHOD FOR EVALUATING VOIDS AND PARTICLES IN SOLIDS

(71) Applicant: Schlumberger Technology Corporation, Sugar Land, TX (US)

(72) Inventors: Hafsa Ahmed, Evry Courcouronnes (FR); Vitoria Mussi Toschi, Clamart (FR); David Thuilliez, Clamart (FR); Guillaume Deville, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 231 days.

(21) Appl. No.: 18/832,243

(22) PCT Filed: Apr. 8, 2022

(86) PCT No.: PCT/IB2022/000205
§ 371 (c)(1),
(2) Date: Jul. 23, 2024

(87) PCT Pub. No.: WO2023/194764
PCT Pub. Date: Oct. 12, 2023

(65) Prior Publication Data

US 2025/0117899 A1 Apr. 10, 2025

(51) Int. Cl.
*G06T 5/75* (2024.01)
*G06T 5/10* (2006.01)

(52) U.S. Cl.
CPC .................. *G06T 5/75* (2024.01); *G06T 5/10* (2013.01); *G06T 2207/10061* (2013.01); *G06T 2207/10116* (2013.01); *G06T 2207/30152* (2013.01)

(58) Field of Classification Search
CPC ....... B33Y 10/00; B33Y 80/00; G06F 1/1626; G06F 1/1643; G06F 1/1652;
(Continued)

(56) References Cited

U.S. PATENT DOCUMENTS 7,903,864 B1 * 3/2011 Lina ...................... G06T 7/0008 382/141
2010/0282874 A1 * 11/2010 Nakamura ........... H10N 30/883 310/366

FOREIGN PATENT DOCUMENTS

CN 106651839 A 5/2017

OTHER PUBLICATIONS

Search Report and Written Opinion of International Application No. PCT/IB2022/000205 dated Dec. 5, 2022, 15 pages.

(Continued)

*Primary Examiner* — Alex Kok S Liew
(74) *Attorney, Agent, or Firm* — Kyle R. Miiller

(57) ABSTRACT

A system for evaluating an image of a material. The system includes an image processing unit that obtains an image of an internal portion of a target material, the image including pixels, and a filtering controller that performs noise filtering of the pixels of the received image. The system includes avoid separation controller that extracts a subset of the pixels corresponding to a target region of the image and segments the subset of pixels into a first portion comprising voids and particles and a remaining portion. The system also includes a void and particle counting controller that determines a percentage of the first portion with respect to the target region and presents a report of the target material, the report including the percentage.

20 Claims, 8 Drawing Sheets

(58) Field of Classification Search
CPC ......... G06F 1/1681; G06F 2203/04102; G06F 2203/04103; G06F 3/044; G06F 3/0448; G06T 7/0004; G06T 2207/30148; G06T 2207/10152; G06T 7/11; G06T 7/13; G06T 2207/10056; G06T 2207/10061; G06T 2207/10116; G06T 2207/20036; G06T 2207/20081; G06T 2207/20084; G06T 2207/30141; G06T 2207/30152; G06T 5/10; G06T 5/75; G06T 7/136
See application file for complete search history.

(56) References Cited

OTHER PUBLICATIONS

Kovac, O. et al., “Image Processing of Die Attachs X-Ray Images for Automatic Voids Detection and Evaluation”, 2016 39th International Spring Seminar on Electronics Technology, 2016, pp. 199-203.
Said, A. F. et al., “Automated Void Detection in Solder Balls in the Presence of Vias and Other Artifacts”, IEEE Transactions on Components, Packaging, and Manufacturing Technology, 2012, 2(11), 12 pages.
“Schiele, T. et al., ““Comparison of deep learning-based image segmentation methods for the detection of voids in X-ray images of microelectronic components””, 2021 IEEE 17th International Conference on Automation Science and Engineering (CASE), 2021, 6 pages.”

* cited by examiner

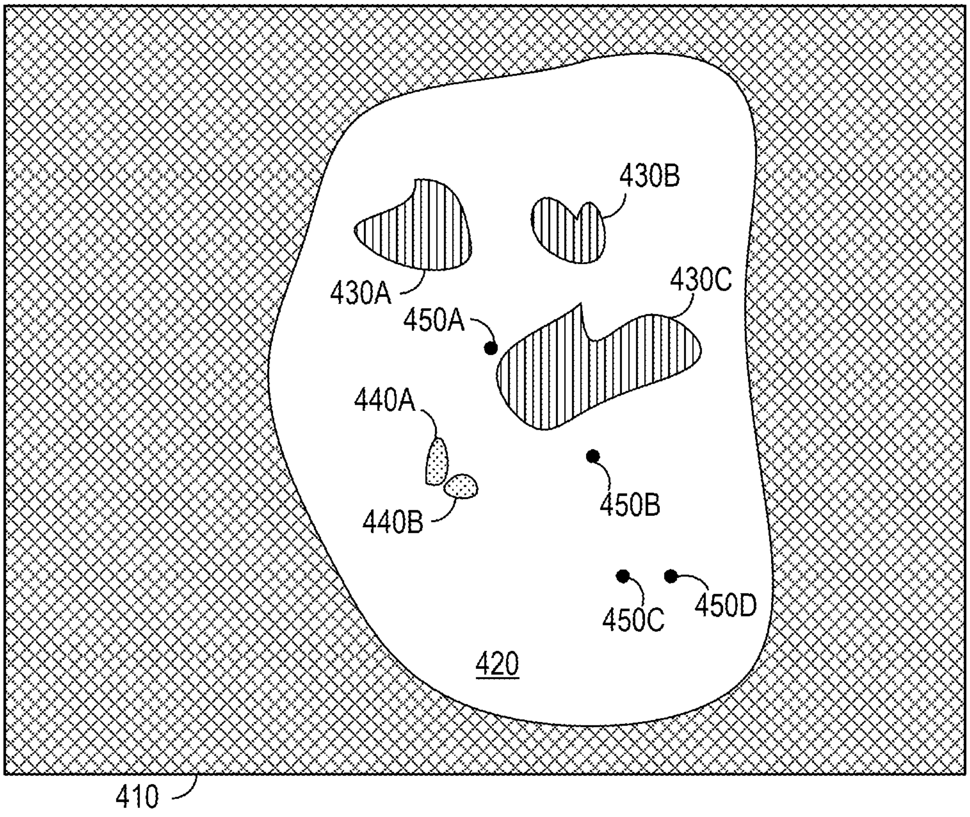
FIG. 4.1

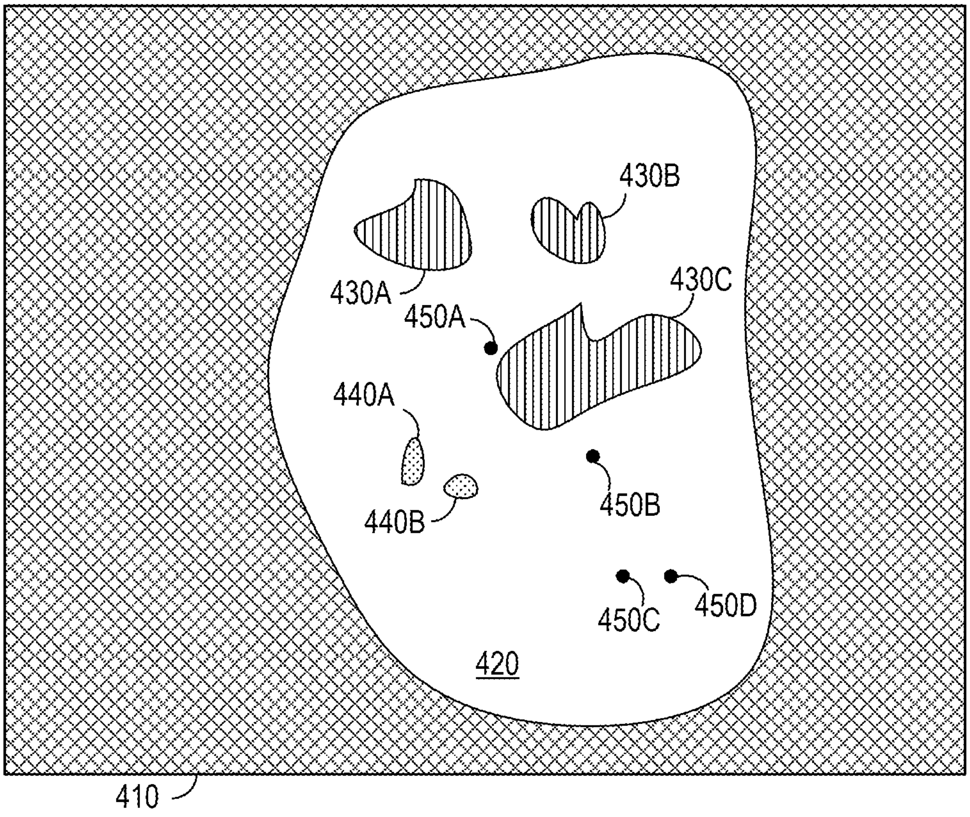
FIG. 4.2

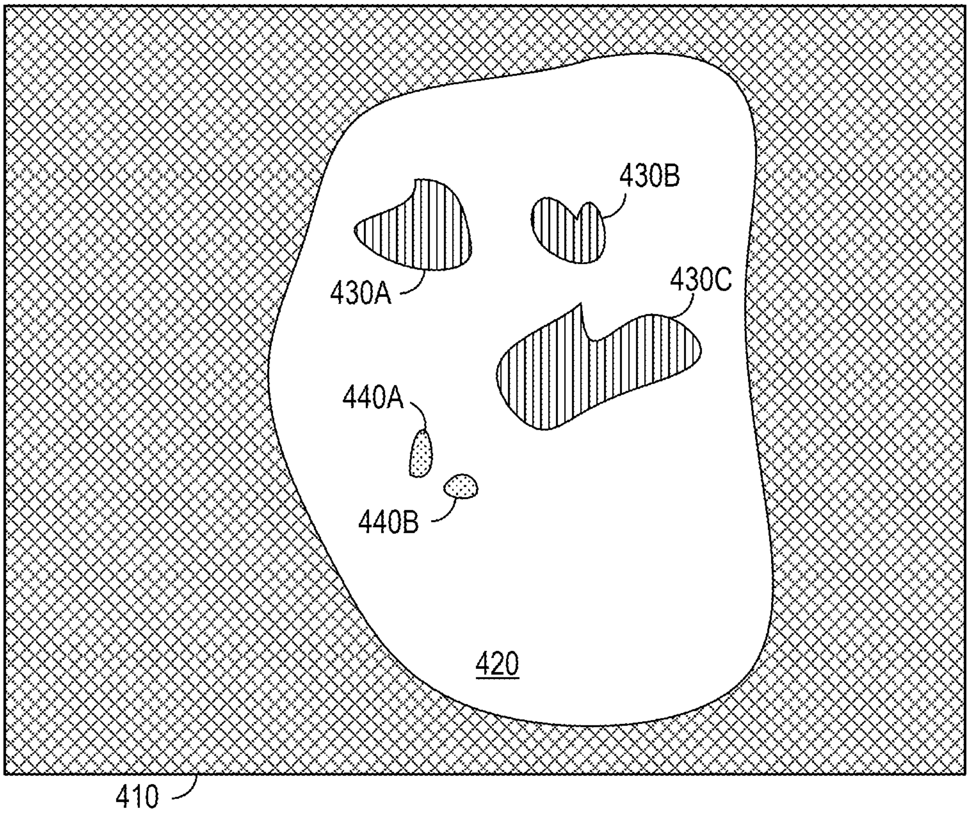
FIG. 4.3

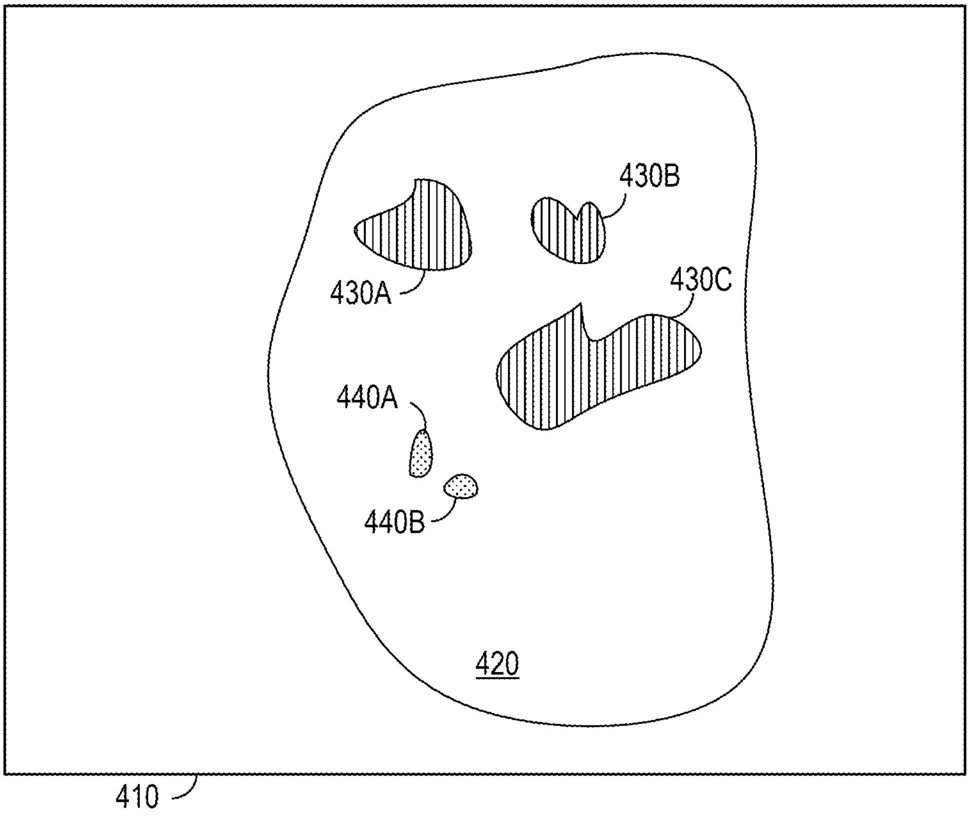
FIG. 4.4

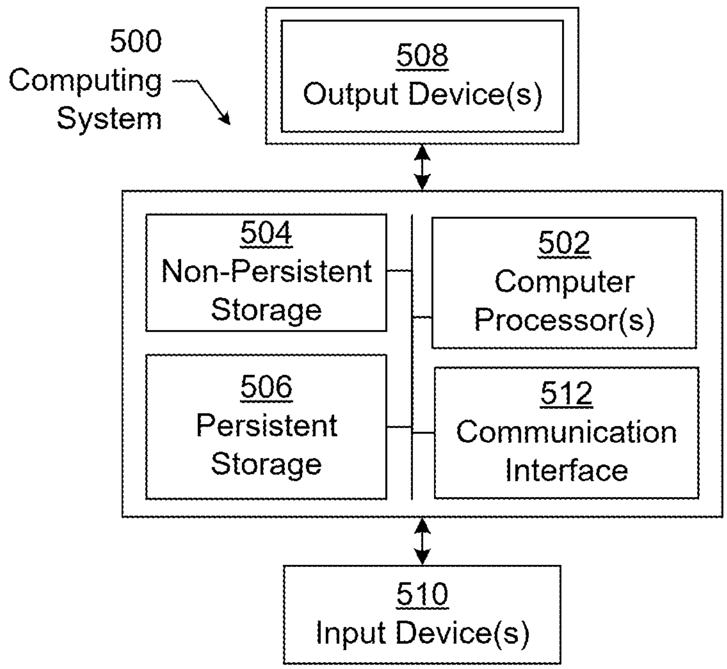
*FIG. 5.1*
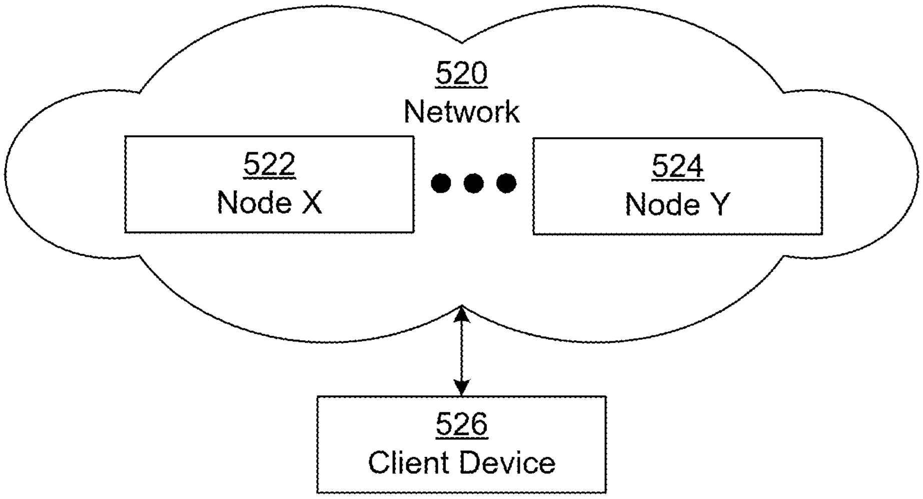
*FIG. 5.2*

SYSTEM AND METHOD FOR EVALUATING VOIDS AND PARTICLES IN SOLIDS

This application is a National Stage Entry of International Application No. PCT/IB2022/000205, filed Apr. 8, 2022, which is incorporated herein by this reference in its entirety.

BACKGROUND

Manufacturing processes frequently use solder or resin to encapsulate and adhere components to a printed circuit board (PCB) or other mounting platform. However, voids, dust particles, and the like often contaminate the solder. This increases the likelihood of component failure and reduces the effectiveness of the manufacturing processes. Moreover, the glass particles are used as an additive to the resin deposits and their concentration is important for determining the properties of the resin. Manufacturers employ systems and processes to evaluate the percentage of voids, contaminant particles and/or additive in a solder or resin/glue to ensure the reliability of the adhering material and to decrease the probability of having a defect linked to high-ratio or high-volume occurrences of voids and/or contaminants. By way of example, the evaluation of the glass percentage in a resin is used to evaluate the resistance and the reliability of the resin. The electronics industry sets different limits on the void percentage, on the maximum void size in solders and glues, and on the glass percentage in resins, depending on the expected reliability level and on the particular electronics technology (PWA, MCM, etc.). Current methods for automatic quantitative analysis of voids and glass percentages from microscope and X-ray analysis are frequently imprecise.

SUMMARY

It is an object of the present disclosure to provide a method of material image processing. The method includes obtaining an image of an internal portion of a target material, the image including pixels, and performing noise filtering of the pixels of the received image. The method also includes extracting a subset of the pixels corresponding to a target region of the image and segmenting the subset of the pixels into a first portion comprising voids and particles and a remaining portion. The method also includes determining a percentage of the first portion with respect to the target region and presenting a report of the target material, the report comprising the percentage.

BRIEF DESCRIPTION OF DRAWINGS

Features and advantages of the described implementations can be more readily understood by reference to the following description taken in conjunction with the accompanying drawings. Like elements in the various figures are denoted by like reference numerals for consistency.

FIGS. 4.1, 4.2, 4.3, and 4.4 illustrate images associated with selected steps in the method of FIG. 3, according to one or more embodiments of the present disclosure.

FIGS. 5.1 and 5.2 show a computing system in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

The present disclosure describes a method and system for analyzing and quantifying the percentages and sizes of voids in solders or glue in X-ray images or the percentages of glass in resins in microscope images, including scanning electron microscopes (SEM) and optical microscopes. The disclosed system includes an image processing unit that employs image filtering and image enhancement techniques to produce improved images of the interior of a material, such as, for example, a solder ball or a resin/glue ball. The image processing unit enhances the differences between objects in the interior of a material and provides more accurate measurements of the percentage that contaminants, voids and additives represent in a bonding material.

Figure 1:
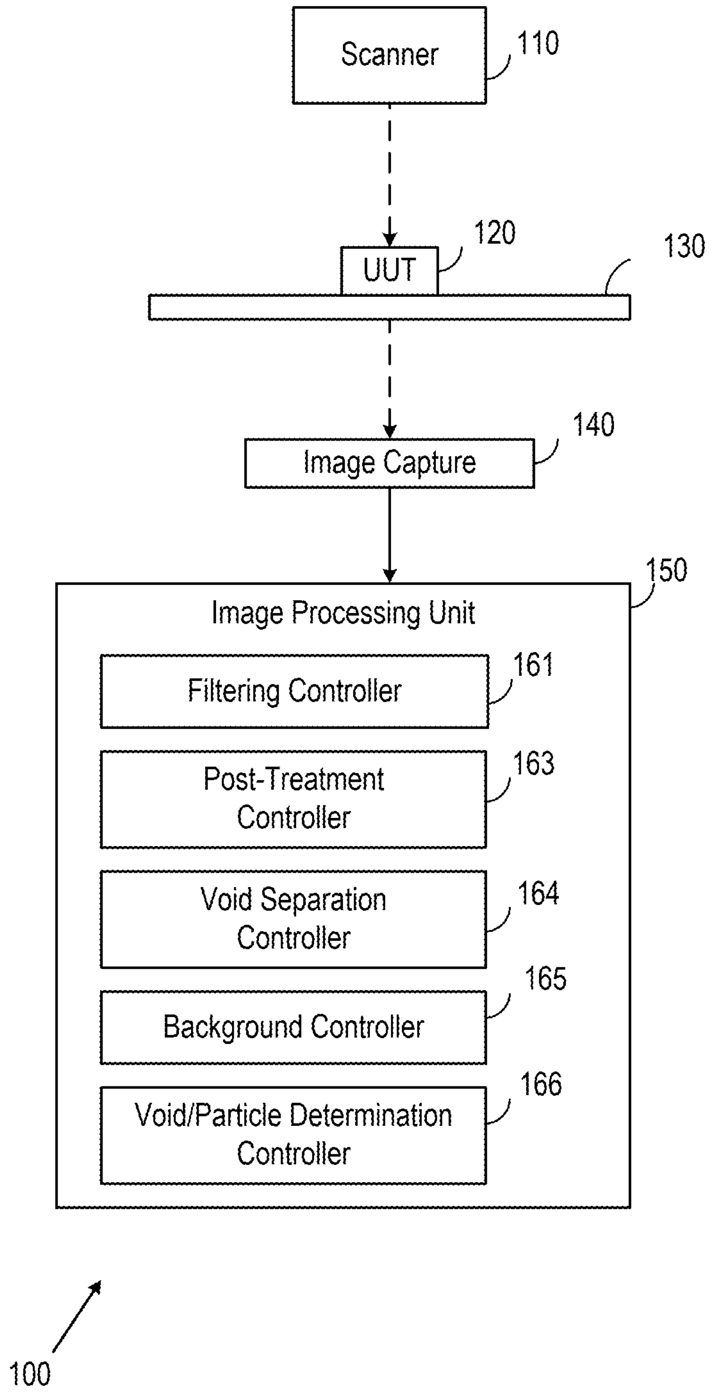
FIG. 1 illustrates an imaging system that evaluates voids and particles in solids, glues, and resins, according to one or more embodiments of the present disclosure.

FIG. 1 illustrates an imaging system (100) that evaluates voids and particles in solids, glues, and resins according to one or more embodiments of the present disclosure. The imaging system (100) includes a scanner (110), a support surface (130), an image capture device (140), and an image processing unit (150). Support surface (130) supports a unit-under-test (UUT) (120), which may be, for example, an integrated circuit mounted on a printed circuit board. The integrated circuit may be bonded to the printed circuit board by solder or by glue. It may be desired to evaluate the solder or glue that holds the integrated circuit to the printed circuit board. Alternatively, it may be desired to evaluate a glass particles present in the resin of an integrated circuit.

In an example embodiment, the scanner (110) is an X-ray generator that projects a scanning beam through the UUT (120). The X-ray image is then captured by the image capture device (140), which may be an X-ray detector. In an alternate embodiment, the scanner (110) may be a part of an optical microscope that projects light through a resin in the UUT (120) and the image capture device (140) may be a camera. The image capture device (140) captures the image of the UUT (120) in digital form and transfers the digital image to the image processing unit (150).

The image processing unit (150) includes a filtering controller (161), a post-treatment controller (163), a void separation controller (164), a background controller (165), and a void/particle determination controller (166). Each of the filtering controller (161), the post-treatment controller (163), the void separation controller (164), the background controller (165), and the void/particle determination controller (166) may comprise software code executed by the image processing unit (150) that performs one or more particular image processing functions. The software code may be implemented as algorithms, such as those shown in FIG. 2 and FIG. 3.

The filtering controller (161) is configured to filter pixels in the image to reduce image noise, to increase the image sharpness, and to reduce the imperfections on the brightness. The filtering controller (161) may perform, for example, non-local means filtering. Non-local means filtering is an image processing algorithm for image denoising. Unlike a "local means" filter, which takes the mean value of a group of pixels surrounding a target pixel to smooth the image, a non-local means filter takes a mean of the pixels in an image, weighted by how similar the pixels are to the target pixel. This provides greater post-filtering clarity and less loss of detail in the image compared with local means algorithms.

The filtering controller (161) also may perform, for example, unsharp filtering of pixels to sharpen edges on the elements without increasing noise. Unsharp filtering is an image sharpening technique that uses a blurred or "unsharp" negative image to create a mask of the original image. The unsharp mask is then combined with the original positive image, creating an image that is less blurry than the original. The resulting image is clearer but may be a less accurate representation of the image's subject.

The post-treatment controller (163) enables the removal of small objects from the foreground of the image. The post-treatment controller (163) performs a first specific thresholding operation that enables the separation of pixels in a target region or an area of interest (e.g., solder, glue or resin filled area) from the rest of the captured image. The first specific thresholding is performed by a thresholding function that separates the image into two classes of pixels depending on the grey scale level of each pixel. Pixels that exceed a threshold level may be identified as, for example, a part of the solder and the remaining pixels of the captured image may be identified as the rest of the contact pad not covered by the solder. Alternatively, the pixels that exceed a threshold level may be identified as, for example, a part of the resin and the remaining pixels of the captured image may be identified as the area surrounding an integrated circuit.

The post-treatment controller (163) also performs a second thresholding operation that separates the voids from the solder or the glass from the resin within the target region according to the grey scale level of each pixel. Pixels that exceed a second threshold level may be identified as, for example, a void and the remaining pixels of the target region may be identified as the rest of the solder. Alternatively, pixels that exceed a second threshold level may be identified as, for example, a glass particle and the remaining pixels of the target region may be identified as the rest of the resin. The second thresholding operation can separate the voids from the solder or the glass balls from the resin based on grey scale color, independently of having underlying components or structure that affect the grey scale color of the background.

The void separation controller (164) is configured to do a distance thresholding to enable the separation of the voids or glass from each other in the solder or resin. The void separation controller (164) compares the distance between separate objects to a distance threshold to identify objects that are close to each other (e.g., voids, glass particles or any other particle) and that are not part of the same object. The term "close" means within a pre-determined distance. The void separation controller (164) also separates voids that might be fused with each other or with the background.

The background controller (165) is configured to remove the background from the digital image, where the background is the area surrounding the area of interest. The remove background step removes the background on the borders of the image.

The void/particle determination controller (166) is configured to identify, count and calculate the area of the voids or glass in the image and to combine these calculated areas with the calculated area of the target region (i.e., solder, glue or resin filled) to determine the voids and glass as a percentage of the total area of the target region (or area of interest). The counting voids operation calculates the separated objects total percentage (voids, glass particles or any other particles) inside the pad (the part filled with solder, resin or matrix) as well as the percentage of each object inside the pad.

According to an embodiment, the void/particle determination controller (166) may calculate the areas of voids, glass particles, solder balls, and resin balls by counting the number of pixels within each object. In an example embodiment, the pixels within an object are configured in horizontal rows. For each horizontal row that intersects an object, the void/particle determination controller (166) may count the number of pixels between the left and right boundaries to determine a pixel count for that horizontal row. This procedure is repeated for each horizontal row that intersects an object and the pixel counts for the rows are then summed to determine a total pixel count for the object. The area of the object is determined by the total pixel count. Therefore, a first void having twice as many pixels as a second void is determined to have twice the area.

Figure 2:
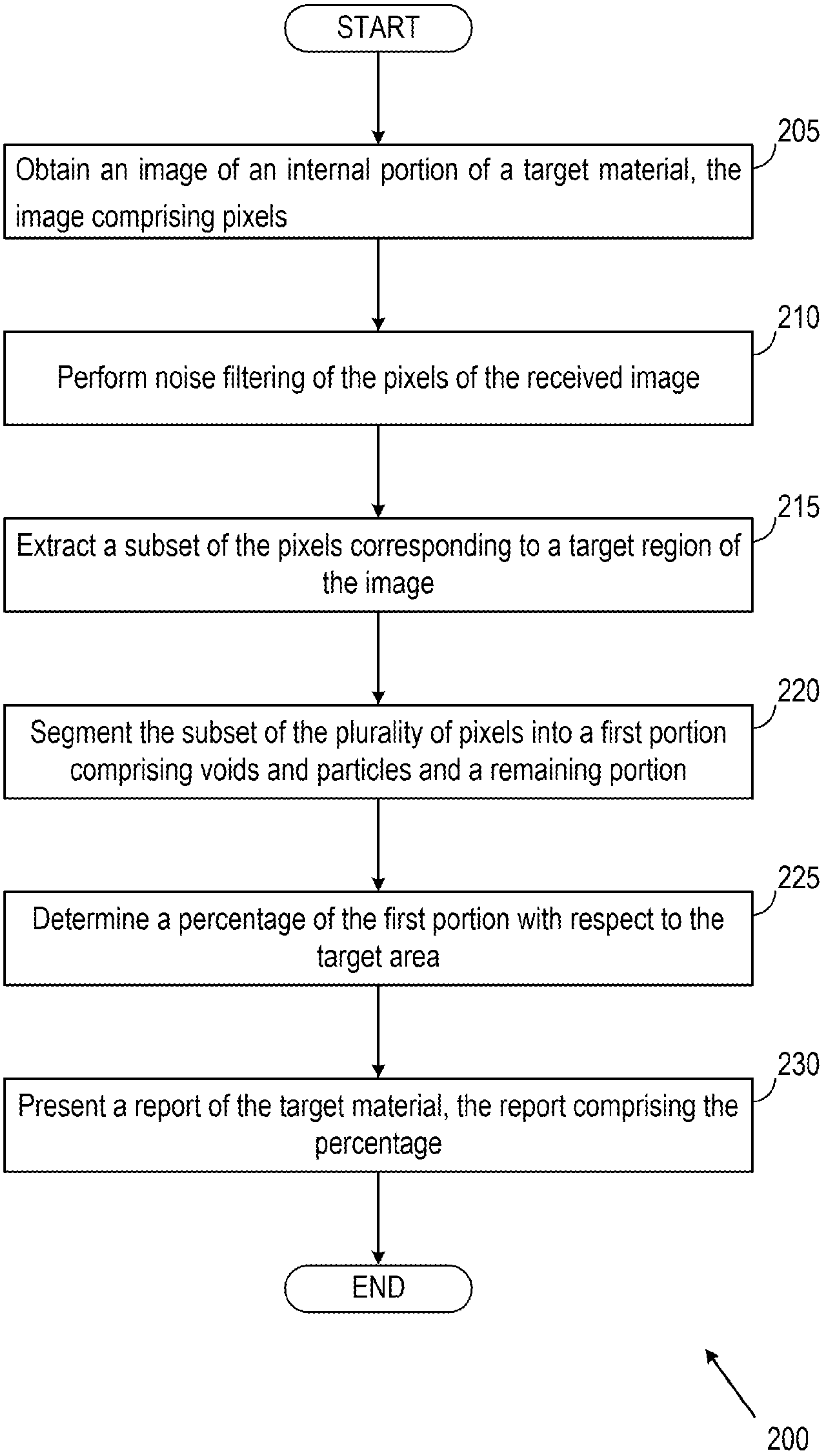
FIG. 2 is a method, according to one or more embodiments of the present disclosure.

FIG. 2 is a flow diagram (200) illustrating a method according to one or more embodiments of the present disclosure. The method of FIG. 2 may be performed using the system of FIG. 1.

In block (205), the image processing unit (150) obtains an image of an internal portion of a target material. The image may be received from the image capture device (140) and includes pixel data.

In block (210), the image processing unit (150) performs noise filtering of the pixels of the received image. The noise filtering may be performed as described above with respect to the noise filter.

In block (215), the image processing unit (150) extracts a subset of the pixels corresponding to a target region of the image. For example, the pixels of the target image are identified according to an intensity distribution of pixels around the image. The identified pixels are then extracted as a subset for further processing.

In block (220), the image processing unit (150) segments the subset of the plurality of pixels into a first portion that includes voids and particles and a remaining portion. As described above, a pixel intensity threshold may be used to identify whether a given pixel is a pixel in a void or a pixel in a particle or a pixel in a remaining portion. The pixels are segmented accordingly into segments.

In block (225), the image processing unit (150) determines a percentage of the area of the first portion with respect to the area of the target region. Thus, for example, the total number of pixels in a void may be divided by the total number of pixels in the target region in order to determine the percentage.

In block (230), the image processing unit (150) presents a report of the target material, wherein the report includes the percentage of the first portion with respect to the target region area. The report may include a processed image of the target material where the target region (solder or resin) is presented in a first color, voids are presented in a second color, glass particles in a third color, and so forth. The report may be displayed to a user, or may be fed to another automatic process as input for further processing.

In other embodiments, the report may include a ratio of the first portion to the remaining portion. By way of example, if the area of the first portion is "3A" and the area of the remaining portion is "A" (i.e., total area of target region is "4A"), then the first portion is 75% of the target region. Alternatively, the ratio of the first portion to the remaining portion is 3:1.

Figure 3:
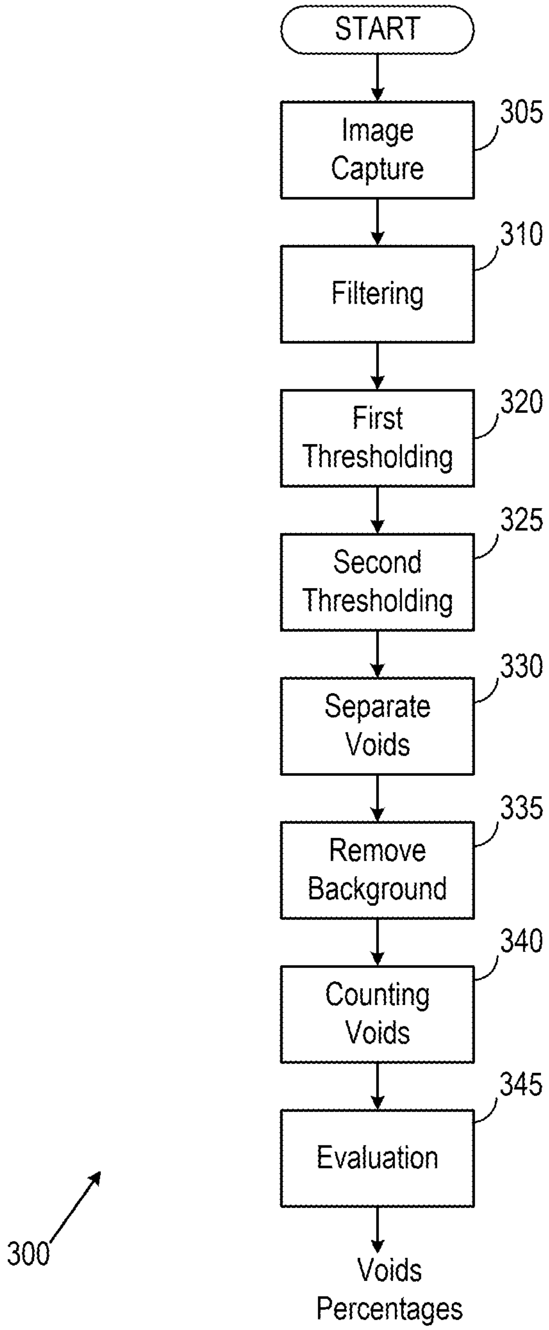
FIG. 3 is an evaluation method, according to one or more embodiments of the present disclosure.

FIG. 3 is a flow diagram (300) illustrating a void and particle evaluation process according to one or more embodiments of the present disclosure. The method of FIG. 3 may be performed using the system of FIG. 1. The method of FIG. 3 is a more detailed implementation of the method in FIG. 2. FIGS. 4.1-4.4 illustrate selected images associated with selected steps in the method of FIG. 3 according to one or more embodiments of the present disclosure. Thus, references to FIGS. 4.1-4.4 are made in the context of the blocks described with respect to FIG. 3.

In block 305, the imaging system (100) captures an image by image capture device (140) and transfers the digital image to image processing unit (150). As noted above, the image capture device (140) may be an X-ray detector that captures a digital image.

With respect to block 305, reference is made to FIG. 4.1. FIG. 4.1 is an example of a captured image. The captured image includes a target region (420) and a background area (410). The background area (410) encompasses the entire captured image and is shaded with a cross-hatched pattern. The target region (420) is the irregularly shaped area of interest (e.g., a solder, a glue/resin or other deposit). The target region (420) includes void (430A), void (430B), and void (430C), which are shaded with a vertical-line pattern. The target region (420) also includes glass particle (440A) and glass particle (440B), which are shaded with a dot pattern. Finally, the target region (420) may include very small contaminants (450A, 450B, 450C, 450D), which appear as black dots in the captured image.

In block 310, the imaging system (100) performs one or more filtering operations on the captured image. As noted above, the filtering operations may include, for example, non-local means filtering, unsharp filtering, or other types of filtering. The filtering operations process pixels in the image to reduce image noise, to increase the image sharpness, and to reduce imperfections in brightness.

In block (320), the image processing unit (150) performs a first thresholding operation to separate the target region (420) from the areas of the background (410) outside the target region (420). The thresholding operation separates the image into two classes of pixels depending on the grey scale level of each pixel. For example, pixels that exceed a first threshold may be identified as solder and the remaining pixels of the image area may be identified as the contact pad. Alternatively, the pixels that exceed a first threshold level may be identified as a resin or deposit and the remaining pixels of the target area may be identified as a pad of a PCB.

In block (325), the image processing unit (150) performs a second thresholding operation that separates the voids from the solder and separates the glass from the resin within the target region (420). The second thresholding operation separates the voids from the solder or the glass from the resin within the target region (420) according to the grey scale level of each pixel. Pixels that exceed a second threshold level may be identified as a void and the remaining pixels of the target region (420) may be identified as solder. Alternatively, pixels that exceed a second threshold level may be identified as a glass ball and the remaining pixels of the target region (420) may be identified as resin. The second thresholding operation separates the voids from the solder or the glass from the resin/glue based on grey scale color, independently of having underlying components or structure that affect the grey scale color of the background.

In block (330), the image processing unit (150) performs a distance thresholding operation that separates voids or glass particles that might be fused with each other. The distance thresholding operation compares the distance between separate objects to a distance threshold to identify objects that are close to each other (e.g., voids, glass particles, or any other particle) and that are not part of the same object. With respect to block (330), reference is made to FIG. 4.2. FIG. 4.2 is an example of a captured image in which glass particles have been separated. In FIG. 4.1, glass particle 440A and glass particle 440B are in contact with each other. After the distance thresholding operation, the glass particle 440A and the glass particle 440B have been separated in the captured image.

In block (330), the image processing unit (150) also performs a post-treatment operation that identifies the small contaminants (450A, 450B, 450C, 450D) that appear as small dots in the captured image after the thresholding operations are completed. The image processing unit (150) may identify a small dot as any object that has less than a threshold number of pixels. Alternatively, the image processing unit (150) may identify a small dot as any subject pixel that has a significantly different grey scale color than the pixels surrounding the subject pixel.

The image processing unit (150) then removes the black dots of the contaminants (450A, 450B, 450C, 450D) from the captured image. With respect to block (330), reference is made to FIG. 4.3. FIG. 4.3 is an example of a captured image in which the contaminants (450A, 450B, 450C, 450D) have been removed. It is noted that the image processing unit (150) may perform the post-treatment operation that removes the black dots before the distancing thresholding operation in order to make it easier to identify objects that are separated by less than the distance threshold.

In block (335), the image processing unit (150) removes the background area (410) from the captured image. FIG. 4.4 is an example of a captured image in which the background area (410) has been removed, leaving the target region (420).

In block (340), the image processing unit (150) identifies, counts, and calculates the area of the voids or glass particles from the captured image and compares these calculated areas with the calculated target region (420) (i.e., the solder, glue or resin filled area) to obtain the voids or glass percentages in relation to the solder, glue or resin filled area. For example, the image processing unit (150) may calculate the areas of voids, glass particles, solder balls, and resin balls by counting the number of pixels within each respective object.

In block (345), the image processing unit (150) performs an evaluation operation in which a result is generated, such as a spreadsheet with the area percentage and the final image of the separated voids and target region (420), such as in FIG. 4.4. In the final image, the target region (solder or resin) may be presented in a first color, voids may be presented in a second color, glass particles in a third color, and so forth.

The disclosed system and method can separate the voids from the solder or the glass balls from the resin respective to its color on a grey scale image and independently of having underneath components or structures that change the background grey scale color. The disclosed system and method can then calculate the area percentage of this separated voids/glass balls with regard to the total area of interest (resin/solder).

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the invention.

The computing system or group of computing systems described in FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

While the disclosure has been described with respect to a limited number of embodiments, those skilled in the art, having benefit of this disclosure, will appreciate that other embodiments can be devised which do not depart from the scope of the disclosure as disclosed herein.

What is claimed is:

1. A method of material image processing comprising:

obtaining an image of an internal portion of a target material, the image comprising a plurality of pixels, each pixel of the plurality of pixels having a grayscale value of a plurality of grayscale values;

performing noise filtering of the plurality of pixels of the image;

extracting a target region of the image, wherein extracting the target region includes:

performing a first thresholding operation to the plurality of pixels based on the plurality of grayscale values, the first thresholding operation separating the image into a first class having a first subset of pixels of the plurality of pixels with the grayscale value above a first threshold and a second class having a second subset of pixels of the plurality of pixels with the grayscale value below the first threshold, wherein the target region includes the first class;

performing a second thresholding operation on the first subset of pixels of the plurality of pixels, the second thresholding operation separating the first subset of pixels of the plurality of pixels into a particle subset of the plurality of pixels and a void subset of the plurality of pixels;

using the void subset of the plurality of pixels, identifying voids in the target region; and performing a distance thresholding to the first subset of pixels of the plurality of pixels to identify a distance between the voids;

responsive to the void subset, the particle subset, and the distance, determining a percentage of the void subset with respect to the target region; and presenting a report of the target material, the report comprising the percentage.

2. The method of claim 1, wherein performing the noise filtering of the plurality of pixels comprises increasing a sharpness of the image.

3. The method of claim 1, wherein performing the noise filtering of the plurality of pixels comprises reducing an imperfection in a brightness of the image.

4. The method of claim 1, wherein performing the noise filtering of the plurality of pixels comprises unsharp filtering of the plurality of pixels.

5. The method of claim 1, wherein performing the noise filtering of the plurality of pixels comprises non-local means filtering of the plurality of pixels.

6. The method of claim 1, wherein the particle subset identifies glass particles in the image.

7. The method of claim 1, wherein the target region comprises an area filled with one of solder, glue, or resin.

8. The method of claim 1, wherein the image comprises an X-ray image.

9. The method of claim 1, wherein the image comprises an optical microscope image or a scanning electron microscope image.

10. A system for evaluating an image of a material comprising:

an image processing unit configured to obtain an image of an internal portion of a target material, the image comprising a plurality of pixels, each pixel of the plurality of pixels having a grayscale value of a plurality of grayscale values;

a filtering controller configured to perform noise filtering of the plurality of pixels of the image;

a void separation controller configured to:

extract a target region of the image, wherein extracting the target region includes:

performing a first thresholding operation to the plurality of pixels based on the plurality of grayscale values, the first thresholding operation separating the image into a first class having a first subset of pixels of the plurality of pixels with the grayscale value above a first threshold and a second class having a second subset of pixels of the plurality of pixels with the grayscale value below the first threshold, wherein the target region includes the first class;

performing a second thresholding operation on the first subset of pixels of the plurality of pixels, the second thresholding operation separating the first subset of pixels of the plurality of pixels into a particle subset of the plurality of pixels, and a void subset of the plurality of pixels;

using the void subset of the plurality of pixels, identifying voids in the target region; and performing a distance thresholding to the first subset of pixels of the plurality of pixels to identify a distance between the voids using the void subset of the plurality of pixels; and a void and particle counting controller configured to:

responsive to the void subset, the particle subset, and the distance, determine a percentage of the void subset with respect to the target region; and present a report of the target material, the report comprising the percentage.

11. The system of claim 10, wherein the filtering controller filters the plurality of pixels to increase sharpness of the image.

12. The system of claim 10, wherein the filtering controller filters the plurality of pixels to reduce an imperfection in a brightness of the image.

13. The system of claim 10, wherein the filtering controller is an unsharp filter that enhances an edge of the image.

14. The system of claim 10, wherein the filtering controller comprises a non-local means filter.

15. The system of claim 10, wherein the particle subset identifies glass particles in the image.

16. The system of claim 10, wherein the target region comprises an area filled with one of solder, glue, or resin.

17. The system of claim 10, wherein the image comprises an X-ray image.

18. The system of claim 10, wherein the image comprises an optical microscope image or a scanning electron microscope image.

19. The method of claim 1, wherein performing the distance thresholding includes separating voids fused with each other or a background of the image.

20. A non-transitory computer readable medium having stored therein instructions executable by a computer system to cause the computer system to:

obtain an image of an internal portion of a target material, the image comprising a plurality of pixels, each pixel of the plurality of pixels having a grayscale value of a plurality of grayscale values;

perform noise filtering of the plurality of pixels of the image;

extract a target region of the image, wherein extracting the target region includes:

performing a first thresholding operation to the plurality of pixels based on the plurality of grayscale values, the first thresholding operation separating the image into a first class having a first subset of pixels of the plurality of pixels with the grayscale value above a first threshold and a second class having a second subset of pixels of the plurality of pixels with the grayscale value below the first threshold, wherein the target region includes the first class;

performing a second thresholding operation on the first subset of pixels of the plurality of pixels, the second thresholding operation separating the first subset of pixels of the plurality of pixels into a particle subset of the plurality of pixels, and a void subset of the plurality of pixels;

using the void subset of the plurality of pixels, identifying voids in the target region; and performing a distance thresholding to the first subset of pixels of the plurality of pixels to identify a distance between the voids using the void subset of the plurality of pixels, wherein performing the distance thresholding includes separating voids fused with each other or a background of the image;

responsive to the void subset, the particle subset, and the distance, determining a percentage of the void subset with respect to the target region; and presenting a report of the target material, the report comprising the percentage.

* * * * *